April 14, 1964

R. R. HENSZEY 3,129,131

SPRAY DRYING APPARATUS

Filed Oct. 27, 1960

INVENTOR.
Richard R. Henszey
BY Dominik & Lazo
Attorneys

April 14, 1964 R. R. HENSZEY 3,129,131
SPRAY DRYING APPARATUS
Filed Oct. 27, 1960 3 Sheets-Sheet 2

INVENTOR.
Richard R. Henszey
BY
Dominik & Lazo
Attorneys

April 14, 1964   R. R. HENSZEY   3,129,131
SPRAY DRYING APPARATUS
Filed Oct. 27, 1960   3 Sheets-Sheet 3
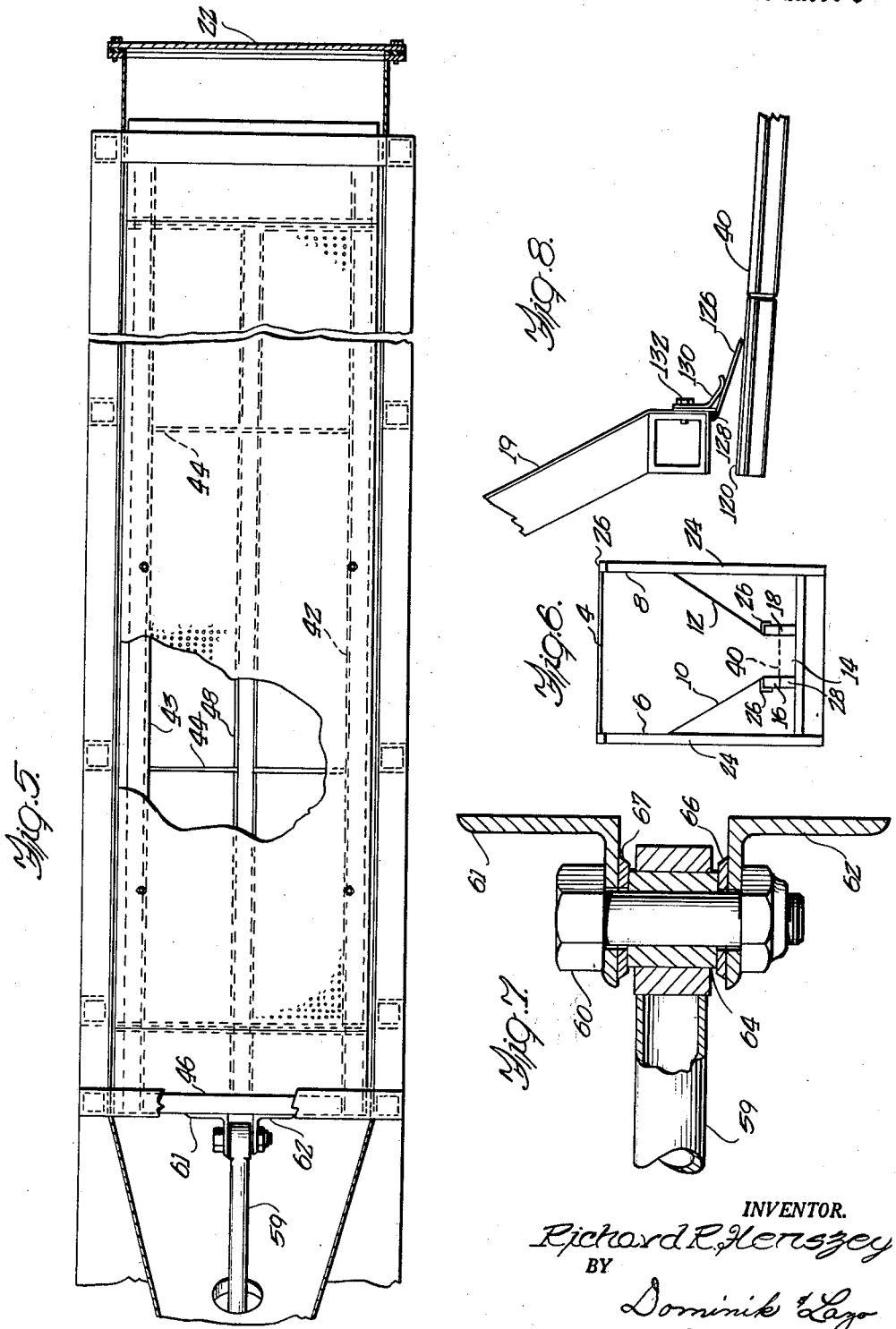
INVENTOR.
Richard R. Henszey
BY
Dominik Lazo
Attorneys 3,129,131
SPRAY DRYING APPARATUS
Richard R. Henszey, Oconomowoc, Wis., assignor, by mesne assignments, to C. E. Rogers Company, Detroit, Mich., a corporation of Michigan
Filed Oct. 27, 1960, Ser. No. 65,357
1 Claim. (Cl. 159—4)

This invention relates to a method and apparatus for drying. In one preferred aspect, the invention related to a method and apparatus for drying milk or a liquid derived therefrom, preferably milk in a concentrated form to yield a dried milk product which is readily reconstituted by the addition of water. The invention is more broadly applicable to producing solids from sprayable, or atomizable, materials in a liquid state.

For convenience in discussion, it is assumed that milk or a liquid derived therefrom is the material undergoing treatment. The word "milk" is used in this connection to refer to whole milk, skim milk, evaporated milk, concentrated liquid forms of whole or skim milk (e.g., with a portion of the moisture removed), and in general to a liquid derived from whole milk and from which a dried milk solid (dried milk product) can be prepared. However, it is to be understood that the invention is also applicable for the preparation of a solid product from a liquid vehicle, examples of which are dye solutions, coffee, liquors that are the by-products of yeast manufacture, and liquors that are the by-products of malt beverage manufacture.

One known manner of preparing dried milk solids or a dried milk product is to entrain a spray of milk in a horizontal stream of hot gases flowing through a horizontal chamber and to maintain the milk in the chamber for a time sufficient to form milk solids. The milk solids, when further dried in the chamber to a predetermined point, are recovered as a dried milk solids product. Ordinarily, absolute dryness is not desired in the product. For example, the American Dry Milk Institute specifies 2.5% moisture for extra grade whole dry milk (derived from whole milk), 4.0% moisture for extra grade non-fat dry milk (derived from skim milk) and 5.0% moisture for instant grade nonfat dry milk (a very easily and rapidly reconstituted product derived from skim milk), all percentages being by weight. The shelf life, flavor, solubility and dispersibility (the latter two affecting the reconstitutability of the dried milk solids) are all adversely affected if the product is too dry or too wet as the case may be. Thus, terms such as "dried," "dry" or the like, as used herein, refers to a generally solid product having therein a preselected amount of a fluid, generally water.

Broadly speaking, there are two groups of milk solids formed in executing the drying method described above. The group with the larger particles ("heavies") falls to the bottom of the chamber while the group containing smaller particles ("fines" remain suspended in the stream of hot gases and extracted moisture that is sweeping through the chamber. The fines fall slowly, at the rates in the range from 0.05 to 6 feet per minute. The heaviest fall out so promptly upon being formed that they are far from dry and, because of their large size as compared to the fines, are exceedingly more difficult to dry than are the much smaller fines. The sizes of the individual particles in the respective groups are determined by numerous operating variables such as velocity of the stream sweeping through the chamber, length of the chamber, material being treated, and rapidity of drying, to name a few.

The drying in one operation, using a horizontal flow, of such diverse materials as the fines and heaviest presents a difficult task, relying for success upon skillful operators, close and continuous inspection of the product, and constant adjustments of operating conditions, to name a few, in order to achieve a product of preselected moisture content. In the preparation of dried milk products, the heavies have theretofore been dried by providing a longer residence time and/or a higher temperature for both the heavies and fines to reach the desired dryness. Increasing both or either of the factors of time or temperature have heretofore tended to burn or scorch the fines, thus lending a cooked taste to the dried milk product and also affecting its dispersability and solubility.

In addition, the fallout of the heavies creates a handling problem because they must be moved through the drying chamber in some fashion so that drying is promoted, whereas the fines are swept through the chamber and dried by reason of being entrained in the stream of hot gases. One such means for transporting the heavies is set forth in the United States Patent 2,815,071 issued to Henszey et al. on December 3, 1957.

The principal object of the present invention is to provide a method and an apparatus for drying both fines and heavies to the correct or predetermined degree of dryness. To this end, the heavies are transported through the drying chamber at a different, preferably slower rate than are the fines, but the temperature is maintained at a level commensurate with the obtention of the dryness of both heavies and fines. In the preferred embodiment, a perforated vibrating bed support is provided in the bottom of the drying chamber. The vibration is cyclical and such as to move the heavies at an appropriate rate through the chamber while tumbling them in a blast of a heated drying gas emerging through the perforations. The heavies thus have a longer residence time in the drying chamber and thus are dried to the desired degree. The fines and heavies are separately recovered from the drying chamber and can be combined in various proportions if desired. Another factor in determining the sizes of particles in the fines and heavies is the velocity and quantity of the heated drying gas introduced through the perforations.

Thus, another object of the invention is to provide a method and apparatus for the drying of skim milk, whole milk, or a liquid derived from milk. A further object is to provide a method and apparatus for spray drying skim milk, milk, milk concentrate and the like to produce a dried whole milk by allowing a gravitational separation of solid particles and then transporting the heavier particles through the drying chamber at a different rate than the lighter particles. Another object is to provide a spray drying method and apparatus for transporting the heavy milk solid particles through a drying chamber through the agency of a cyclically moving bed.

An advantage secured by practicing the invention as set forth herein is that the fines and the heavies can each be dried to an appropriate degree in one pass through the equipment (process) without having to apply excessive heat to the one or insufficient heat to the other. In this connection, a further advantage is derived in that a more uniform dryness of the product is obtained. These advantages are arrived at by the novel feature of advancing the heavies through the drying chamber at a rate less than that of the fines. A further advantage and feature is that the fines and the heavies are recovered separately, and can either be shipped separately to persons requiring a product of one size or the other, or the two can be admixed in various proportions. Other advantages and features, as set forth in greater detail below, include remoisturizing by controlling the humidity in various zones through the agency of introducing moisturized or extremely dry air, the addition of flavoring by introduction of flavoring powders at the upper end of the chamber but close to the exit of the solid particles, and many unique design features that enable spray drying to produce a dried milk solids product suitable for human consumption and particularly so because of the design features facilitating the cleaning of operating parts.

Other objects, advantages and features will become apparent from a reading of the following description taken in conjunction with the drawings wherein:

FIGURE 5 is a partially cutaway bottom view of the bed in its enviroment at the bottom of the chamber;

FIGURE 6 is a schematic cross section showing the general shape of the chamber and orientation of the bed therein;

FIGURE 7 is an enlarged view of the connecting rod-to-bed joint;

FIGURE 8 is an enlarged view of the upstream hot air passage chamber-to-bed seal.

Figures 1, 2:
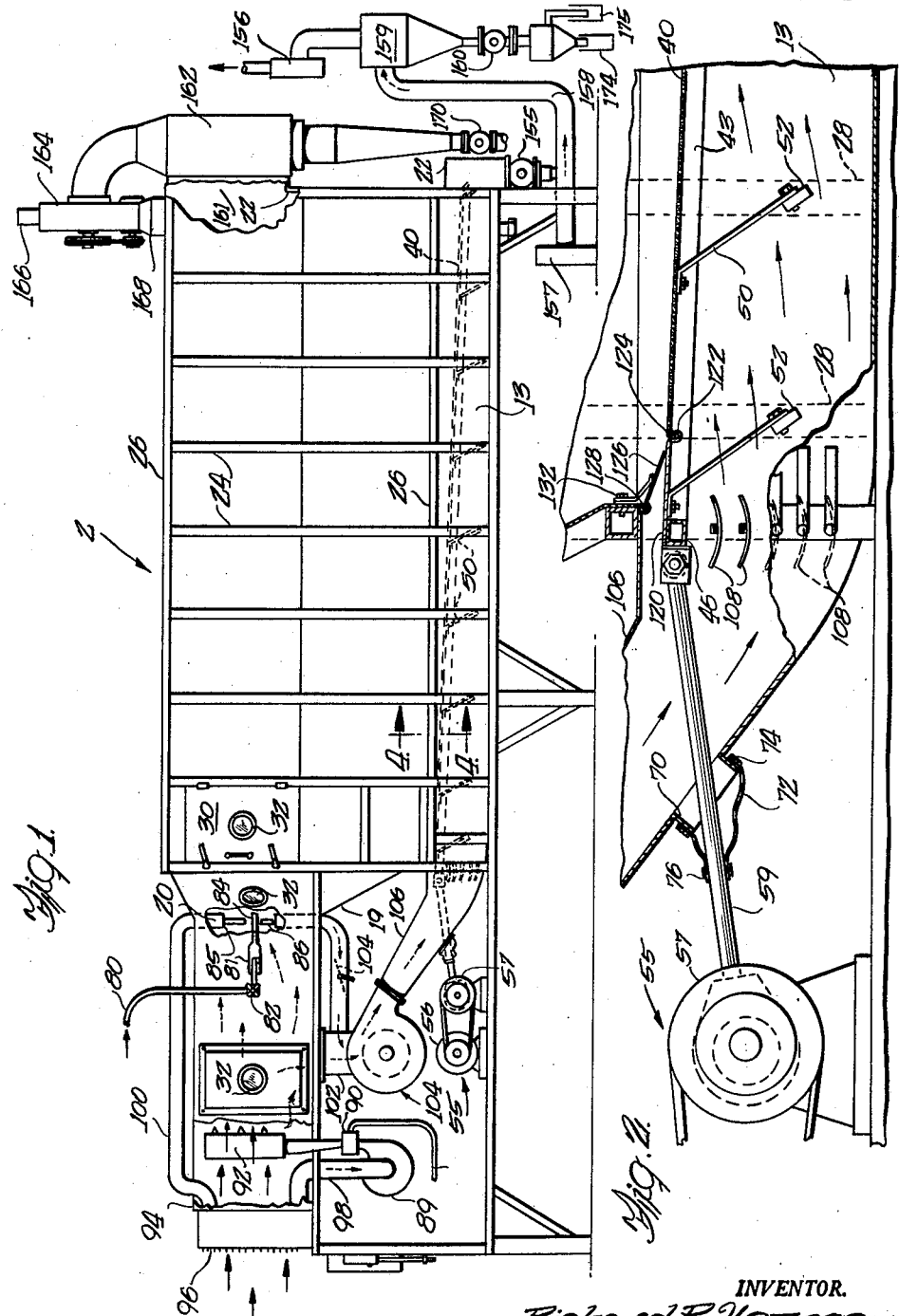
FIGURE 1 is a partially cut away side assembly view of an embodiment of the invention.
FIGURE 2 is a cross section of a part of the side view at the upstream end showing details of the vibrator, bed support mounting, and air flow control.

Referring now to the drawings and particularly to FIGURES 1, 5 and 6, there is seen an enclosed elongated horizontal chamber 2 that is defined by a plurality of walls which are preferably of welded stainless steel construction. The upper, or drying portion, of the chamber is defined by a top wall 4, a pair of upper vertical walls 6 and 8 depending respectively from the sides of the top wall 4, and a pair of oblique convergent walls 10, 12 extending toward each other and toward the bottom of the drying portion of the chamber. A gas flow passage 13 for drying gases is defined beneath the perforated bed support 40 (FIGURE 2) at the extreme bottom of the chamber by a bottom wall 14 and a pair of lower vertical walls 16, 18 extending upwardly therefrom to respective longitudinal junctions with the lower edge of the oblique walls 10 and 12.

The upstream end of the drying chamber may be a flat wall, but in the embodiment shown is a frusto-pyrimidal set of walls which provides a sloping wall 19 connecting the lower portion of the chamber with a hollow wall 20. The downstream end of the chamber, that opposite 20, is a generally flat wall 22 (FIG. 3) which has a plurality of openings connecting to recovery means, discussed below.

The elongated horizontal drying chamber is provided with structural support by a structural steel framework that includes columns 24 extending from the ground to the top of the upper vertical walls 6 and 8, stringers 26 which can be of angle iron or of tubular steel extending longitudinally of the chamber and being welded to the upper ends of each of the columns, and struts 28 extending upwardly along the lower vertical walls 16, 18. If desired, a platform can be provided to raise the entire construction above the ground level as seen in FIGURE 1, for example. The platform may eliminate the necessity for digging a pit in order to assemble certain of the solids recovery devices to the chamber 2. An access door 30, to enable persons to get inside the chamber for purposes of inspection and cleaning, is hingedly mounted to the framework and locked to sealingly engage the upper wall portions of the chamber. Observation ports 32 are provided in various places to enable inspection of different portions of the process during operation.

Additionally referring to FIGURES 2 and 4, there is seen a generally perforated bed support or tray 40 formed by two like-constructed halves upon which the heavies are transported and dried. By a plurality of bolts 41, the perforated bed is removably bolted to and supported upon a framework comprising a pair of longitudinal bed stringers 42, 43 running along respective sides of the bed and connected by intermediate bed cross bars 44 and end bed cross bars 46. Advantageously, nuts 41*a* are welded to the stringers to facilitate fastening. The bed stringers and the end bed cross bars are preferably of stainless steel angle iron, except for the intermediate cross bars 44 which are of stainless steel strap iron, and welded between the stringers 42. The intermediate cross bars 44 provide vertical support to the bed at the central portion thereof by the inverted central channel 48 (see FIGURES 4 and 5). The latter is preferably welded to the cross bars 44. This construction provides light weight, low inertial forces during vibration, rigidity against buckling, minimal resistance to air flow, and provides vertical support sufficient to permit persons to walk down through the chamber for the purposes of cleaning and inspection.

Studs 49 are welded to the stringers and in conjunction with nuts 49*a* removably secure the bed support frame and bed to a plurality of springs 50. The bolted assembly permits removal of the tray and frame for purposes of cleaning the air passage at the bottom of the chamber, effecting repairs, and inspection. The springs are all constructed alike except the rearmost two, to simplify the dynamic characteristics of the system and are mounted on studs 52 which extend inwardly of walls 16, 18 and which are arranged on a sloping line in welded assembly to the walls 16, 18 at points where the wall is welded to the strut 28. The rearmost two are mounted directly on the bottom 14. The height of the rear springs determines in part the depth of the air passage under the screen. These two springs are designed to be the same as the rest in vibration frequency. The springs 50 thus provide a means for resiliently supporting the perforated bed in sloped, movable relationship relative to the chamber 2.

A means 55 for vibrating the bed support or tray by harmonically or cyclically reciprocating it in a generally horizontal direction and at a predetermined rate is shown in FIGURES 1, 2, 5 and 7. This comprises an electric motor 56 driving a crankshaft 57 through a transmission including a conventional belt and pulley arrangement. Speed variations can be obtained by using a variable speed drive, e.g., a drive wherein pulley diameters are variable. A connecting rod 59 is rotatably mounted on the eccentric portion of the crankshaft 57 and pivotally mounted by means of a wrist pin 60 to the brackets 61, 62 which are in turn welded to and part of the frame supporting the bed. The wrist pin 60 is preferably bolted to the brackets and separated from the bearing portion of the connecting rod by a bronze bearing bushing 64. A pair of washers 66, 67 are respectively inserted between the brackets 62, 61 and the bushing. In one embodiment, the bed support 40 is driven through a stroke of about $\frac{3}{16}$ inch at the natural frequency of the vibrating system, which is about 20 cycles per second. The natural frequency will vary with the size of the bed. Vibration at the natural frequency reduces power requirements. The system includes the tray, frame, connecting rod, and one-half the spring weight.

The air passage 13 has an opening formed therein by a circular connector 70. The connecting rod 59 extends through this opening as best seen in FIGURE 2. A flexible boot 72 of leather, reinforced plastic, or some other impermeable and generally heat-resistant flexible material is connected as by a pipe clamp 74 to the connector 70. The other end of the boot is reduced in diameter and connected by a smaller pipe clamp 76 to the connecting rod 59 at a portion where the latter has a generally circular cross section. In this fashion, a flexible sealing means is provided so that the motive power for vibrating the screen 40 can be located outside of the chamber 2 while maintaining a substantially airtight construction for the chamber, even though there be relative motion between the chamber and the connecting rod 59.

Referring now to FIGURE 1, milk is fed from a pump (not shown) under pressure through a line 80, past the control valve 82, thence out a spray nozzle 84 into the drying chamber 2. The nozzle is disposed in a throat 85 formed in a hollow wall 20. The throat is sufficiently large so that from 50% to 90% of the air flowing into chamber 2 is admitted through it, whereby it flows in practically a straight line path to the upper exit port 161. Advantageously, turbine blades 86 can be mounted within the throat, as taught in United States Patent 2,815,071 issued to Henszey et al. The balance of the air, from 10% to 50% is admitted through the perforations in the bed 40.

A latch plate 81 is pivotally secured to the side of the chamber, whereby it can be slipped up and down to admit the piping between valve 82 and nozzle 84. It is preferable that a section of the pipe 80 be flexible so that the nozzle can be readily removed through the port covered by latch plate 81. This feature facilitates inspection and cleaning. Suitable pipe connections, e.g., an assembly of two elbows and a nipple are provided between the valve and nozzle, thereby to extend the pipe from the side of the chamber over to the central portion where the throat 85 is disposed. Where required, suitable support means can be provided for the nozzle, e.g., a pair of brackets depending from the top of chamber 2 with means for accommodating U-bolts or pipe clamps at the lower end, the pipe itself being positioned within the U-bolt or pipe clamp. The port covered by the latch plate 81 is, of course, sized so that the piping assembly can be readily passed therethrough and positioned.

Hot gases for the purposes of drying the milk or other feed stream coming in through 80 are derived from a gas-burning apparatus shown at the left end of FIGURE 1. This includes a feed pipe 88 for the gas, a blower 89 for sucking air through the filter 96 and discharging it into a mixing chamber 90 where gas from the feed pipe is mixed with air, and an appropriate set of burners 92 for producing hot gases and for heating up the air drawn into the burning chamber 94. The balance of the requirement of air is furnished to the burning chamber by drawing it through the filters 96 and past the burners 92. Automatic controls can be provided for maintaining gas flow at a preselected set point, and/or for controlling gas and air flows and proportions to maintain a suitable mixture discharge temperature.

A portion of the air drawn through the filters is passed through a pipe 100 to flow through the hollow wall 20. The purpose of this is to provide a stream of cool filtered air to maintain the wall 20 at a relatively low, cool temperature so that any spray from the nozzle 84 will not contact the wall 20 and burn or char thereon, thus creating unpalatable solids which may fall off the wall and be transported out of the chamber in admixture with the product. The hot air-combustion gas mixture is drawn out of the chamber 94 into a mixing chamber 102 by a blower or compressor 104. In like fashion, the blower induces the flow of air through the pipe 100 and the hollow wall 20, thence to the mixing chamber 102 where the wall-cooling air is admixed with the other hot gases from chamber 94. Control of the relative amount of air going through the wall 20 and through the burning chamber is effected by a butterfly valve 104 which is shown as mounted in the filter-hollow wall mixing chamber path, but could as well be inserted in the other path from the filters through the chamber 94 to mixing chamber 102.

The blower 104 has its intake connected to the mixing chamber 102 and thoroughly mixes the air from both paths. The mixture of hot gases and hot air is then discharged from the blower into the shaped passageway 106 and thence into the flow passage 13 underneath the perforate bed support 40. Flow distribution is obtained by disposing a plurality of louvers 108 at the upstream end of the air passage and securing them in appropriate positions to secure the desired air distribution along the length of the perforate bed support 40. It will be noted that the bed support 40 is sloped to provide a smaller air flow passage at the downstream end, thus to compensate for the decreased quantity of gases flowing in the flow passage 13.

The blower is preferably driven by an electric motor, not shown.

Figure 3:
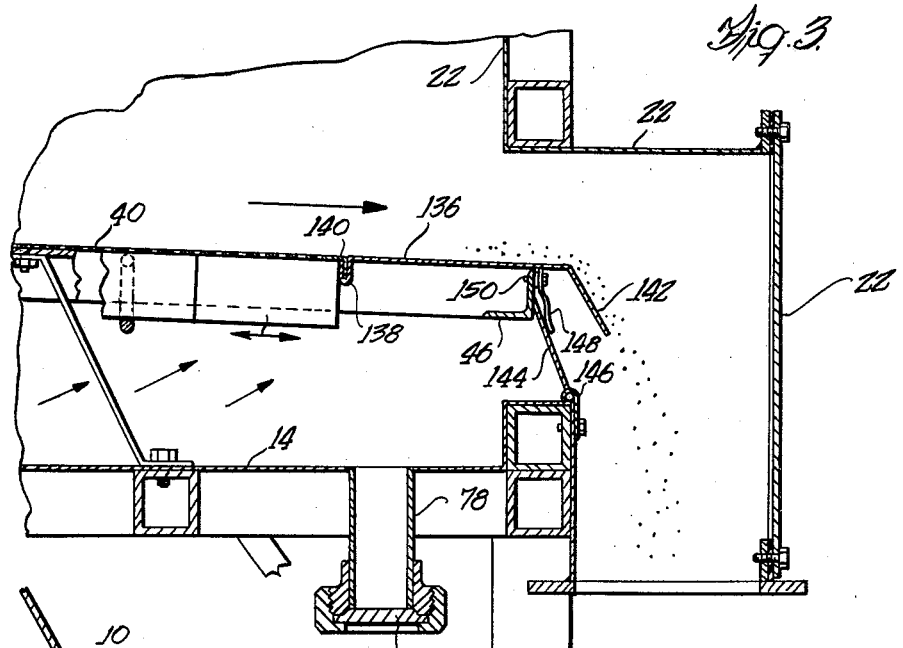
FIGURE 3 is a cross section at the downstream end of the bed showing the manner of sealing the hot air passage between the bed and the chamber bottom and other features.
Figure 4:
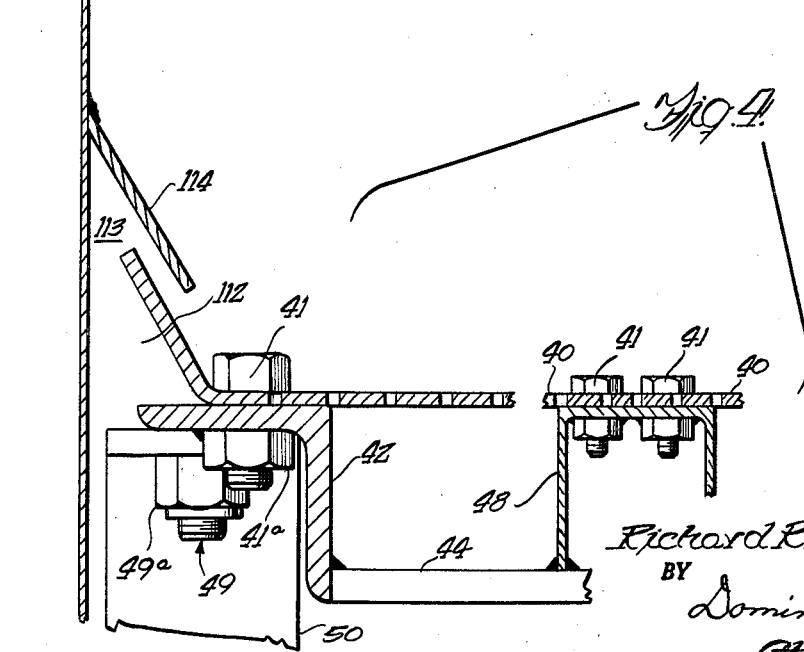
FIGURE 4 is a partial end cross section along 4—4 of FIGURE 1 showing the longitudinally extending labyrinth seals as associated with the bed, and the central bed support strip.

FIGURES 3, 4 and 8 illustrate the means for sealing between the walls of the chamber 2 and the perforated bed support 40, whereby a seal is maintained during the motion of the bed support and is effective enough to prevent short circuiting of the flow of hot drying gases by leakage around the sides and the ends of the bed support. It is, of course, very important that the hot drying gases flow upwardly through the various ports in the perforate bed support 40 so that adequate drying contact is obtained between the gases and the heavies that are collected upon the bed support. As is shown, it is preferable that all or substantially all of the gases flow through the perforations in the bed support. In addition, the flow through the bed support 40 should be maintained to prevent any substantial quantity of heavies from falling through the perforations in the bed support.

FIGURE 4 illustrates the means provided to prevent flow of material around the longitudinally-extending edges of the perforate bed support or tray 40. Briefly, this comprises a labyrinth seal of a design that permits inspection, cleaning and removal. The tray or bed support 40 is formed with an imperforate edge 112 that is bent upwardly at an oblique angle to extend into an inverted V-shaped region 113 that is formed by welding the oblique downwardly and inwardly-extending flange 114 along the inside of the wall 16. The flanges 112 and 114 extend substantially the full length of the bed support and the chamber, respectively, leaving only sufficient clearance at the ends to avoid mechanical interference when the bed support 40 is vibrated. There is also sufficient clearance provided in the inverted V-shaped slots so there is no physical contact between the flange 112 and the walls defining the slot 113. The small cross section for flow presented by the clearances between flange 114 and the sides of the slot 113 are such that any substantial amount of hot gas flow therethrough is prevented.

As previously mentioned, the bed support is formed by two like-constructed halves 40 to enable easy assembly and disassembly by bolting the halves to the stringers 42 by means of bolts 41. The bolts threadedly engage nuts which are welded to the stringers. A similar assembly is used to secure the bed support at the center to the channel 48. The construction of each half of the bed support is a mirror image of that of the other side, only one side having been described for the sake of brevity. Advantageously, as in FIGURE 4, the nuts are welded to the underside of the members on which they are mounted, thus to facilitate assembly and disassembly.

Referring now to FIGURES 2 and 8, there is shown the means for sealing at the upstream end in the perforate plate to prevent the flow or short circuiting of hot drying gases around the end of the plate at that point. The seal is maintained during vibration of the bed support. Briefly stated, this means comprises providing an imperforate portion of the plate and resiliently biasing a sealing member against the imperforate portion, thereby permitting the requisite vibratory motion of the bed support while at the same time maintaining a sealed connection. The advantage of this construction is that no soft plastic materials have to be used to effect the seal, metal to metal contact being sufficient, and thus avoiding the danger of grating and wearing away a plastic gasket which would in turn affect the purity of the product. A similar feature and advantage is found in the construction to be discussed relative to the downstream seal as shown in FIGURE 3.

Referring now to FIGURES 2 and 8, it is seen that an imperforate portion of the bed support, a plate 120, is welded (or bolted) to the frame between the stringers and the end cross bar 46. Note that the end cross bar at this point is formed by welding together two angle irons to form a rectangular cross section having the rigidity necessary for receiving the forces from the vibrating means 55. The downstream portion of the plate 120 is reversely bent to form a laterally-extending slot 122. The extreme upstream portion of the perforated bed support 40 is downwardly bent into this slot, thereby achieving a mechanical connection helping to buttress the plate 40 against the longitudinal forces due to vibration. The downwardly-bent laterally-extending portion of 40 is denoted as 124. A sealing plate 126 is pivotally connected by a hinge 128 to the wall of the chamber. The seal plate extends laterally of the chamber at the upstream end. A spring 130, or a plurality thereof, maintains the seal plate 126 biased into sealing engagement with the imperforate plate 120. The hinges 128 can be welded to the end wall of the chamber, but in order to preserve the spring properties of the spring 130, it is preferred to bolt the latter to the end structural member, using a bolt 132.

The means for sealing against air flow around the downstream end of the perforate plate is of generally similar nature, as seen in FIGURE 3. In this instance, an imperforate laterally-extending bed end portion 136 is welded between the bed stringers and is formed with a reversely bent lip 138 to provide a slot for receiving a downwardly-bent portion 140 of the bed support. The extreme downstream portion of plate 136 is bent downwardly at 142 to provide a smooth exit path for heavies falling off the bed support 40 and also to shield the sealing mechanism against an encrustation of heavies flowing off this end of the bed support.

Still referring to FIGURE 3, a laterally-extending seal plate 144 is connected by a hinge 146 to the bottom wall 14 of the chamber. A spring 148 or a plurality thereof is (are) connected by a bolt 150 to the end cross bar 46 of the bed frame. The spring 148 is a leaf type spring that urges the seal plate 144 into sealing contact with a vertically-extending surface of the end cross bar 46. Sufficient clearance is left between the bolt 150, the plate 144 and the lip 142 so that vibration of the bed will permit relative motion between seal plate 144 and the cross bar 46 without mechanical interference of the various parts at this point. A drain 78 with a removable cap 79 is also shown in FIGURE 3.

The systems for recovering the solids are, for the purposes of the present invention, of conventional nature. The principal problem is to maintain an appropriate pressure in the chamber 2 and to provide an appropriate flow path for the gases through the chamber without short circuiting the drying gases. To this end, the heavies are recovered from the apparatus by flowing through a lower port in chamber wall 22 and off the lip 142 (FIGURE 3) and down into an electric motor driven star or rotary valve 155 (FIGURE 1). In substance, a star or rotary valve comprises a plurality of radial paddles rotating in close relationship to the walls of a generally circular chamber, the chamber having a feed at one side and an outlet at the other whereby solids are moved from the feed to the outlet by means of the paddles. The cooperation between the paddles and the chamber wall is of such a nature that substantially no gas flow can take place through the chamber, only solids flow through the agency of the paddles.

The rotary valve 155 receives the heavies falling off the lip 142 and removes them to a recovery or conveying system as the case may be. In the embodiment shown, the recovery system comprises a blower 156 that induces a draft of air by pulling the latter from the room through a filter 157, through a pipe 158 where the stream of air picks up the solids or heavies falling out of the valve 155, and transports them to a cyclone separator 159. The air is withdrawn from the separator to the intake of the blower 156 and is discharged from the blower to the atmosphere. Alternatively, blower 156 can recycle gases into the chamber 2. The solids flow out of the cyclone separator through another rotary valve 160 and can either be packaged directly at this point or can pass through a sizing device such as a sieve, the particles passing the sieve to a package such as a barrel 174, those not passing the sieve into barrel 175.

In the embodiment of FIGURE 1, a separate recovery system for initial recovery of the fines is attached to an upper port 161 in the downstream wall 22 of the chamber 2. The upper port is provided in the downstream wall 22 and connects to the intake of a cyclone separator 162. The flow of gases from the air passage, through the perforate bed support 40, and through the upper region of the chamber 2 in a fashion to sweep along with the flow a quantity of fines, is induced by a blower 164 which has its intake connected to the gas outlet from the cyclone separator 162. The blower 164 can either discharge the gases withdrawn from the chamber to the atmosphere through discharge 166, or flavoring materials such as cocoa can be added and discharged through conduit 168 into the downstream end of the chamber for admixture with the fines prior to recovery of the admixture. The fines are removed from the cyclone separator by a star valve 170 and can be transported to further recovery, or even admixture with the heavies, by a system such as that shown connected to the output from the rotary valve 155.

In operation the flow of gas is started into the burner unit 88—92 and the electric motors (not shown) that drive blower 89 and blower 104 are started. Burning is conducted for a short period of time, five to ten minutes, until the entire burning chamber and chamber 2 has warmed up to approximately operating temperature. Then all of the electric motors driving the vibrating bed support, the rotary valves 155, 160, 170, the blowers 156, 164, and other appurtenances of the recovery system are started. In the drawings, the electric motors driving the rotary valves are not all shown.

Then the valve 82 is opened a predetermined amount and the flow of milk is started into the chamber. As explained above, the spray nozzle 84 introduces the milk in a finely divided form whereby it can be most effectively contacted by the hot drying gases present in the chamber. The milk supply is preferably drawn from a source of evaporated milk. The milk can be evaporated in an apparatus such as disclosed in my copending application, Serial No. 49,705, "Apparatus and Method for High Thermal Efficiency Evaporation," filed August 15, 1960. It is preferred to evaporate the milk before feeding it into the apparatus illustrated herein because of the economics involved. It has been found to be much cheaper to remove an initial amount of moisture from the milk by evaporation and then to complete the drying to solids form in accordance with the present invention. However, ordinary milk can be treated. In addition, other materials capable of forming solids upon the removal of moisture or other fluids therefrom, can be treated in the present apparatus.

When the spray of milk emerges from the nozzle 84, a very "hard" drying action takes place in the region approximating the first third of the drying chamber 2. The bulk of the moisture is removed in this region. Thus, the major portion of the heavies is formed at this point, and similarly for the major part of the fines. The heavies fall down on the tray or bed support 40, their point of contact with the bed support being determined by the trajectory of the particular particle in accordance with its mass and the effect thereupon of the draft induced through the chamber.

The draft of gases through the chamber is partly (10%–50% by volume of total gases into chamber 2) up through the perforated bed support 40 and thence to the upper port in the end wall 22 which connects with the cyclone separator 162, and partly (90%–50% on the same basis) through port 85. The fines are entrained in the just-described draft and are transported through the chamber and out of the chamber through the upper port and into the cyclone separator 162. The usual cyclone action takes place and the solids are recovered through the system connected to the rotary valve 170.

Meanwhile, the heavies are moved through the chamber at a different rate commensurate with the residence time required to dry them to the desired moisture content. The motor 55 has been running during the previously-described events, and the heavies thereby transported along the tray 40 to the lower port and discharged from the bed support across the lip 142. The residence time, or velocity along the bed support, is determined (and adjustable) by the cyclic rate of vibration and the stroke. Changing the pulley ratio between the motor and the crankshaft is one way of adjusting the rate, and changing the crankshaft throw changes the stroke. During the course of their transit along the bed support, the heavies are constantly bounced and vibrated while the hot drying gases pass up through the perforations in the bed to initially contact the heavies. At this point, the drying action of the gases is most effective because they have their lowest moisture content, and the ability for the gases to attract moisture out of the heavies is greatest. Drying action is promoted during those time intervals the individual heavy particles have bounced free of the bed and are surrounded by the drying gas stream.

Both the heavies and fines are recovered by passing out through their respective rotary valves 155, 170 into respective and appropriate recovery systems such as that shown in FIGURE 1. If desired, both the fines and heavies can be admixed one with another and sized in a sieve or other separating apparatus such as 162.

Various modifications of the process heretofore described are possible. For example, in order to cool the product before it leaves the chamber, a sealing construction similar to that of FIGURE 3 can be disposed slightly upstream of the lip 142 and a separate cool air supply introduced into the drying chamber through an intervening space of perforations in the bed support 40. In this fashion, hot gases can be introduced into the chamber as previously described while a stream of cold gases is passed through the chamber in contact with both the heavies and fines just prior to their leaving the chamber. A similar construction and method can be employed for introducing moisturized gases in those cases where it is desirable to adjust the moisture content of the product upwardly. In the latter case, the humidity of the air, gas, for example, is adjusted by well-known techniques prior to its introduction into the chamber. Still further, a harder drying action could be achieved in the downstream end of the chamber by introducing hot, dehumidified drying gases.

Following are several examples which are illustrative of the operating conditions and results obtainable with the present invention.

EXAMPLES

In the following tests, a drying chamber having the following dimensions was used:

Length _____ 16 ft.
Width at the top of the oblique walls 10, 12__ 4 ft. 4 in.
Width at the bottom of the oblique walls 10, 12 _____ 20 in.
Vertical height of oblique walls_____ 2 ft. 11 in.
and
Height of chamber above oblique walls_____ 2 ft. 11 in.

Commercially available nozzles were used for spraying, and unless otherwise noted, in the case of tests on milk, skimmed milk and condensed or evaporated milk, a No. 61 nozzle with a No. 421 core as described in "Industrial Spray Nozzles," Catalog No. 24, copyright 1953, by Spraying Systems Co., 3201 Randolph Street, Bellwood, Illinois, was used.

The bed support was adjusted to vibrate at about 12 cycles per second through a stroke of one-quarter inch.

In tests on milk products, very little powder remained on the conveyor, the vibrating bed support 40 because of the upward air velocity, the materials "boiling up" to about five feet off the bed support or tray.

Example I

Sixty gallons of concentrated skim milk containing 43% solids by weight of the mixture were dried. Spraying Systems No. 59 nozzle as described in the above publication, was used. The concentrated skim milk was pumped in through line 80 at 130° Fahrenheit at a temperature of 1350 p.s.i. The following temperatures were observed in the dryer:

Inlet, through throat 85, 350° F.
Outlet, through exit port 161, 205° F.
Agitator air through tray 40, 210° F.

The exhaust fan 164 was operated at a suction pressure of 14 inches of water and exhausted 2990 c.f.m. of water vapor, combustion products, and excess air from the chamber. The chamber was operated at 0.5 inch of water below atmospheric pressure. The air pressure in the air passage 13 was 1.5 inches of water.

The run took approximately two hours at a rate of about 30 gallons per hour. The back four feet (portion 136 of FIGURE 3) of the bed support had no holes in order to facilitate powder removal. Heavies were removed directly from the apparatus of FIGURE 3 into a sealed container, and the fines were collected by a cyclone 162 and passed directly into a sealed drum.

During the first half hour of operation, there was an accumulation of powder on the sloping sides 19, 10 and 12 in the front half of the dryer to a depth averaging one-quarter inch thick. After the first half hour, there was little or no observable increase in the accumulation, but there was some dropping off of the accumulation onto the tray.

One hundred pounds of fines were collected at 5% by weight of moisture. Ninety pounds of heavies were collected at 4.5% by weight of moisture. Approximately forty pounds of solids were accounted for as follows:

Ten pounds adhering to walls in the chamber,
Twenty pounds in milk not pumped into the dryer, and
Ten pounds lost through collection apparatus such as cyclone 162.

The size distribution of the products was as follows:

|  | Less than 75 microns | 75–150 microns | 150–300 microns | Over 300 microns |
| --- | --- | --- | --- | --- |
| Fines, lbs_____ | 90 | 10 | | |
| From conveyor or bed, lbs___ | 9 | 45 | 18 | 18 |
| Lost out stack (estimate), lbs_ | 9 | 1 | | |
| In dryer (as sprayed) estimate, lbs_ | 1 | 6 | 3 | |
| Total, lbs_____ | 109 | 62 | 21 | 18 |
| Percent_____ | 52 | 29.5 | 10 | 8.5 |

One outstanding feature of the above performance was that the heavies were dried more extremely than the fines. The flavor of the product, by taste test, was satisfactory.

Example II

A fifty-minute test was run on the above apparatus using a No. 61 nozzle with a No. 421 core as described in the above publication by Spraying Systems. A condensed skim milk having approximately 43% solids was pumped through line 80 and out of the nozzle at pressures varying between 1300 and 1500 pounds per square inch gauge. These pressures varied between the stated limits during the course of the test. Powder was produced at an approximate rate of 120 pounds per hour. Temperatures were as follows:

Inlet air temperature through throat 85, 360–370° F.
Outlet air temperature through upper port 161, 209°–215° F.
Air temperature in flow passage 13, 220°–222° F.

Pressure in the drying chamber varied between a quarter and one-half inch of water below atmospheric pressure. Exhaust fan 164 discharged the atmosphere as did the fan in Example I above but operated at a suction pressure of 13.3 inches of water and passed 2830 cubic feet per minute of water vapor, combustion products and excess air at the outlet air temperature.

A nonfat dry milk product was formed by the foregoing procedure, and one sample (sample A) was collected from the heavies and another sample (sample B) was collected from the fines discharged from the cyclone collector 162. The two samples were analyzed individually using the procedures of the American Dry Milk Institute, Chicago, Illinois. The following results were obtained in the analyses:

| Sample | Fat, percent | Moisture, percent | Titratable acidity, percent | Solubility index, ml. | Bacterial estimate per gm. | Scorched particles |
|---|---|---|---|---|---|---|
| A | 0.72 | 4.8 | 0.125 | 0.5 | Under 3000 | A (7.5 mg.) |
| B | 0.55 | 4.0 | 0.12 | 0.1 | Under 3000 | A (7.5 mg.) |

| Sample | Flavor | Grade | Analysis |
|---|---|---|---|
| A | Good | Extra | Dispersibility (20 sec.), 46.9 gms. Particle size distribution: Larger than 70 mesh—8.55%. 100–70 mesh—12.90%. 140–100 mesh—20.99%. 200–140 mesh—31.17%. 270–200 mesh—12.43%. Smaller than 270 mesh—5.96%. |
| B | Good | Extra | Dispersibility (20 sec.), 46.3 gms. Particle size distribution: Larger than 70 mesh—0.04%. 100–70 mesh—0.65%. 140–100 mesh—3.76%. 200–140 mesh—26.06%. 270–200 mesh—23.29%. Smaller than 270 mesh—46.20%. |

| Pan No., mesh | Opening, microns |
|---|---|
| 70 | 210 |
| 100 | 149 |
| 140 | 105 |
| 200 | 74 |
| 270 | 53 |

*Example III*

A powdered fat composition manufactured in accordance with United States Patent No. 2,913,342, issued on November 17, 1959, to Cameron et al., was reconstituted by blending with water to a smooth homogenous consistency. Seventy pounds of the powdered fat composition was mixed with one hundred five pounds water to produce a mixture having approximately 40% solids upon redrying. The powdered fat composition contained 60% by weight of hydrogenated cottonseed oil, and the following approximate percentages of other important ingredients:

| | Percent |
|---|---|
| Sucrose | 25 |
| Hydroxylated soy lecithin | 2 |
| Sodium caseinate | 2 |
| Propylene glycol monostearate | 10 |
| Other (moisture, vegetable coloring matter) | 1 |

All percentages are by weight with relation to the mixture. The dryer was operated for thirty minutes. An inlet temperature in the range from 400°–450° F. through the throat 85 and 210° F. through the bed support 40 was maintained. An outlet temperature of 215° F. through the upper exit port 161 was maintained.

The product was collected and the moisture content of the heavies was determined from a number of samples, the moisture test averaging 0.5% moisture on a weight basis.

Additional tests were run on other products such as dye concentrate solutions, by-product solutions from the manufacture of yeast, by-product solutions from the manufacture of malt beverages, and casein derivative solutions of the character used as a base for culture of antibiotics in the manufacture of pharmaceutical products. Satisfactory dryness was obtained in the powdered products, for example, the casein derivitive solutions produced products ranging from 4½% to 6% in dryness.

Thus, it is seen that the invention includes both an apparatus and a method for extracting a fluid from a fluid-like material that forms solids upon the extraction of the fluid. More particularly, the method is directed to the drying of a solution or mixture that forms solids upon being introduced in a finely divided form such as a spray into intimate contact with a heated drying gas. In particular, by reason of the conveyor, that is, the vibrating bed in the bottom of the chamber, a solution can be dried to a suitable dryness even though it produces dried particles of widely varying sizes that require a different residence time in the drying chamber.

Further, the invention is particularly applicable to the drying of liquids to recover as a product proteinaceous hydrophilic colloids, such liquids particularly including milk and liquids derived therefrom from which is recovered either a nonfat dry powder or a fatty dry powder, each of a suitable degree of dryness. When referring to such colloids, an extensive representative list is included in the above Cameron patent. When referring to milk herein, it is meant to include milk of natural character as derived from its natural source, skimmed milk, evaporated or condensed milk, and other liquids that are dryable to solids and which are produced from an animal source (e.g., goat's milk, cow's milk). The following summary sets forth the ranges of operating conditions applicable to the drying of milk, when practicing the invention:

| Feed | Optimum solids in feed, percent by weight | Product | Temperature range, ° F. at inlet (throat 85) | Temperature range, ° F. at outlet (port 161) | Temperature range, ° F. of agitator air (passage 13) |
|---|---|---|---|---|---|
| Concentrated skim milk | 36–48 | Nonfat dry milk | 320–450 | 180–220 | 180–240 |
| Concentrated skim milk | 40–50 | Instant nonfat dry milk | 270–400 | 150–220 | 180–240 |
| Concentrated whole milk | 36–46 | Dry whole milk | 290–350 | 170–200 | 180–220 |

Suitable temperatures in the ranges indicated are obtained by controlling the flow through port 85 and/or by adjusting the mixing means, e.g., butterfly valve 104; through adjusting the flow volume of gases by controlling the rotational speeds of the various blowers 164, 104;

and also by regulating the milk flow by adjusting the valve 82. Ordinarily, the gases flowing through the port 85, past the stationary turbine blades into first contact with the milk spray are warmer than the gases flowing through the bed support 40 because this promotes a hard, drying action in the spray and because the lower bed temperature reduces any tendency to scorch the heavies. A greater volume of gases is required for drying the same volumes or weights of whole milk, skim milk and other liquids having a large quantity of water, of solvent, or other liquid vehicle therein, than is required for similar quantities of milk in a more concentrated form, e.g., evaporated milk and concentrated skim milk. Residence time of the heavies is controlled by adjusting the stroke and frequency. An increase in frequency of bed vibration results in lower residence time, i.e., faster movement of the heavies through the chamber. Similarly as to increasing the stroke. Adjustments in the opposite direction produce opposite results. Where materials other than milk are treated, suitable adjustments in temperature level and other process variables are made in the manner indicated above.

Apparatus according to the invention includes a plurality of walls defining the enclosed elongated horizontal chamber 2. A perforate bed support 40 is movably supported with relation to the chamber on a plurality of springs 50 in a position adjacent the bottom of the chamber and extends longitudinally thereof. The bed is advantageously manufactured so that can be removed readily. Appropriate air seals along the sides and at the ends are provided, whereby short circuiting of the air is minimized, and at the same time the air seal construction permits vibration of the bed without damaging the sealed parts and while maintaining the seal. Appropriate spray means for introducing a spray of liquid, e.g., milk, is mounted in one end of the chamber 2 above the bed. Appropriate means for introducing heated drying gases above the bed and through the bed are provided, the port 85 and the perforations in the bed providing means for, respectively, introducing air above the bed and into immediate contact with the spray of liquid, and through the bed into contact with the liquid spray. Also, means for recovering dried solids are provided. One such means comprises apparatus for separating solids with small particle sizes from a stream of gas in which they are entrained, such as the cyclone separator 162. Another such means for recovering solids includes appropriate sealed means connected to the discharge from the bed or tray whereby air cannot leak past the seal in any appreciable degree, but still providing means for collecting the heavy particles which settle out of the air strain or hot gas strain. Finally, the bed support 40 is connected to appropriate means which harmonically move the bed in a substantially horizontal direction at a predetermined rate. This movement is basically of a cyclic harmonic type and is preferably adjusted to be at the natural frequency of the conveyor and the parts thereof which are intended to be moved, e.g., the trays themselves, the stringers and cross bars immediately supporting the trays, and a portion of the springs supporting the trays.

Among the many features of the invention are the ability to dry, in one path through a single piece of apparatus, a liquid that provides solids of at least two different particle sizes, one of which settles out gravitationally. Means, such as the conveyor tray or bed support 40, are employed to the end that the residence of the heavy particles is commensurate with the time required to dry them and differs from the residence time in the drying chamber of the finer particles which did not settle out gravitationally. One advantage secured through practice of the invention is that there is no necessity for subsequent drying steps in order to further dry the heavy particles. Other features include flexibility to the end that streams of hot gases withdrawn from the drying chamber can be recycled back into the drying chamber, whereby ultrafine particles entrained therein may be recovered. An additional aspect of the recycling feature is that humidity and temperature control can be accomplished in certain portions of the chamber by adjusting the temperature and humidity of the air in the recycle path prior to reintroducing it to the chamber.

While the invention has been disclosed with respect to one particular embodiment, it is to be understood that the disclosed embodiment is illustrative and not limiting. Included within the spirit of the invention as set forth in the following claim are all those alternative embodiments, equivalents, and changes that would be obvious to one skilled in the art with this disclosure before him.

I claim:

Drying apparatus comprising walls defining an enclosed elongated horizontal chamber, a perforate bed support movably supported adjacent the bottom of said chamber and extending longitudinally of said chamber, means for introducing a liquid-containing material to be treated in a dispersed form above said bed support at one end of said chamber, means for introducing a heated drying gas upwardly past said perforate bed support into said chamber above said bed support and into contact with the material to be treated, said bed support being disposed to receive by gravity directly from said means for introducing the portion of the material remaining after contact with the drying gas, means for removing drying products from the opposite end of said chamber, means for horizontally reciprocating said bed support at a predetermined rate, sealing means to minimize leakage of the drying gas around an edge of the bed support, said sealing means including a longitudinally extending flange disposed along the longitudinal edges of said bed support and a longitudinal member mounted on each of the walls adjacent the edges of said bed support, said members defining inverted V-shaped openings in their cross section and being disposed to receive but not to physically engage said flanges within the V-shaped openings, and further including end seal means having an imperforate region at the end of said bed support in the opposite end of said chamber, a sealing plate extending between said imperforate region and the wall at said opposite end of said chamber, and means for supporting said plate in sealing relationship between said imperforate region and said last-named wall.

References Cited in the file of this patent

UNITED STATES PATENTS

| | | |
|---|---|---|
| 2,055,940 | Newhouse | Sept. 29, 1936 |
| 2,084,976 | Puerner | June 22, 1937 |
| 2,320,755 | Smith | June 1, 1943 |
| 2,346,500 | Moore | Apr. 11, 1944 |
| 2,475,984 | Owen | July 12, 1949 |
| 2,561,394 | Marshall | July 24, 1951 |
| 2,635,684 | Joscelyne | Apr. 21, 1953 |
| 2,677,608 | McKay et al. | May 4, 1954 |
| 2,815,071 | Henszey | Dec. 3, 1957 |
| 2,904,323 | Cova et al. | Sept. 15, 1959 |
| 3,012,331 | Oholm | Dec. 12, 1961 |